Nov. 20, 1956 T. TINKER 2,771,290
GAS OFF-TAKE APPARATUS FOR CUPOLAS
Filed March 27, 1953
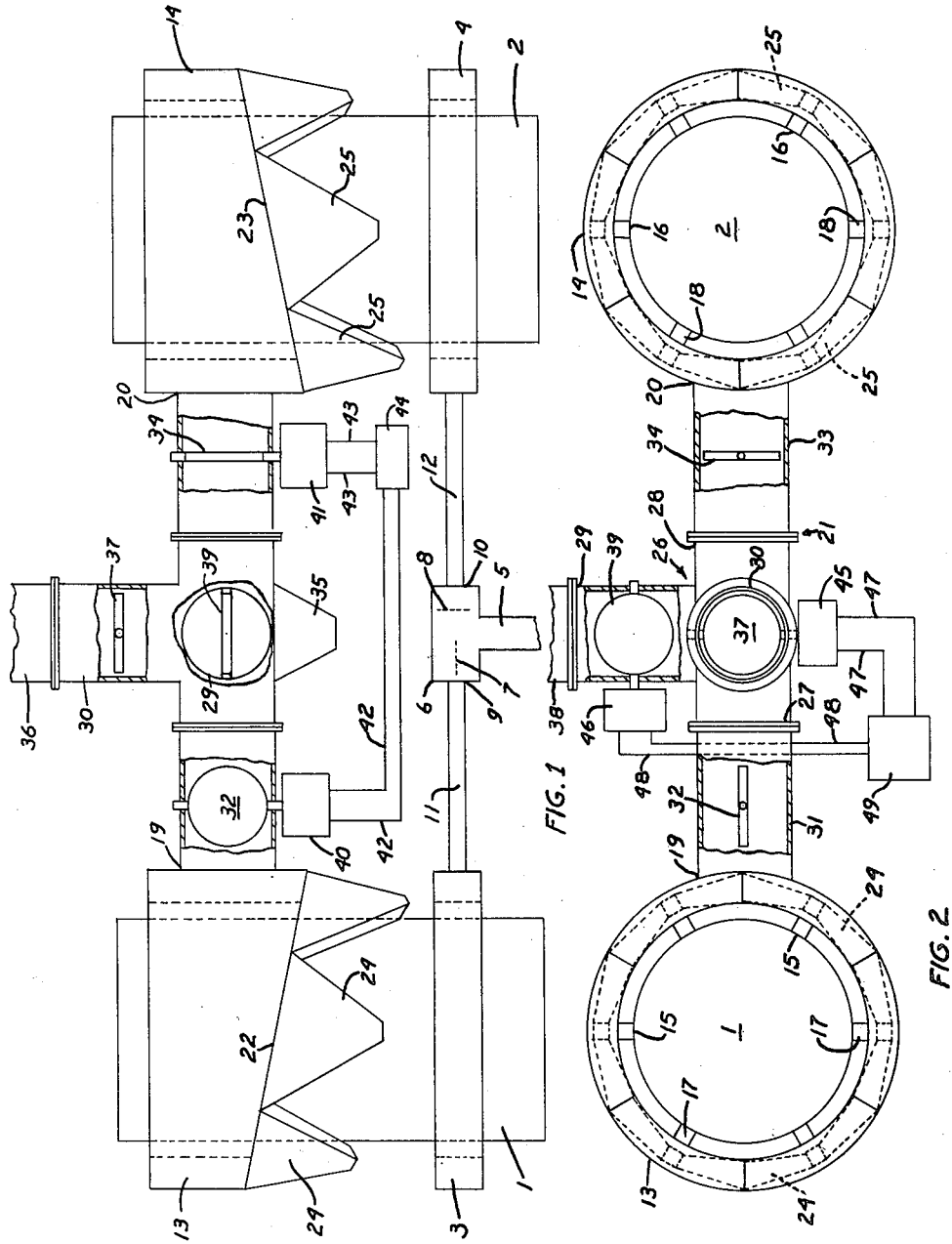
INVENTOR.
TOWNSEND TINKER
BY
Andrew K. Foulds
HIS ATTORNEY United States Patent Office 2,771,290
Patented Nov. 20, 1956

2,771,290

GAS OFF-TAKE APPARATUS FOR CUPOLAS

Townsend Tinker, Orchard Park, N. Y., assignor, by mesne assignments, to American Radiator & Standard Sanitary Corporation, New York, N. Y., a corporation of Delaware Application March 27, 1953, Serial No. 345,171

5 Claims. (Cl. 266—31)

This invention relates to new and useful improvements in iron melting cupolas and more particularly to a gas off-take apparatus in use in conjunction with cupolas.

One of the objects of this invention is to provide a new and improved gas off-take apparatus for use with iron melting cupolas.

Another object is to provide a novel gas off-take apparatus for iron melting cupolas having a means for equalizing the flow of gas from different radial outlets from the cupola.

Another object is to provide a gas off-take mechanism for cupolas including means for collecting foreign particles settling from the cupola discharge gases.

Another object is to provide a novel gas off-take apparatus for cupolas including means for directing the flow of cupola gases through a dump stack upon occurrence of certain unsafe operating conditions.

Another object is to provide a new and improved gas off-take apparatus for joining a pair of alternately operated cupolas and including means for collecting foreign particles settling from discharge gases and for controlling the direction of flow of discharge gases.

Another object is to provide a gas off-take apparatus for cupolas which is simply and inexpensively manufactured and assembled.

Other objects will become apparent from time to time throughout the specification and claims as hereinafter related.

This invention comprises the new and improved construction and combination of parts and their operating relation one to another which will be described more fully hereinafter and the novelty of which will be particularly pointed out and distinctly claimed.

In the accompanying drawing, to be taken as a part of this specification, there is clearly and fully illustrated a preferred embodiment of this invention, in which drawing:

Figure 1 is a view in front elevation of a pair of cupolas having an improved gas off-take apparatus, the view being somewhat diagrammatic, and Fig. 2 is a plan view of the apparatus shown in Fig. 1, and including broken sections of the control dampers.

Referring to the drawing by characters of reference, there are shown a pair of iron melting cupolas 1 and 2 having air inlet bustles 3 and 4, respectively. The cupolas 1 and 2 are arranged for alternate operation and are supplied with air from a fan or blower, which is not shown, through an inlet 5 to a three-way air valve 6. The valve 6 has dampers therein shown diagrammatically as 7 and 8 which are arranged for reverse conjoint operation to direct the flow of air to one or the other of said cupolas. The valve 6 has outlets 9 and 10 connected by conduits 11 and 12 to the cupola bustles 3 and 4, respectively. At the upper ends of the cupolas 1 and 2, there are positioned annular gas off-take bustles 13 and 14, respectively. The gas off-take bustles are radially spaced from and surround their respective cupolas. The cupolas 1 and 2 have a plurality of radially spaced outlets 15 and 16 which are connected by radially extending conduits 17 and 18 to the gas off-take bustles 13 and 14, respectively. The gas off-take bustles 13 and 14 have outlets 19 and 20 which are connected to an outlet fitting or header member assembly 21. The gas off-take bustles 13 and 14 each have downwardly sloping bottom walls 22 and 23, respectively. The downwardly sloping walls of the off-take bustles provide a bustle construction in which there is a minimum predetermined flow area on the side of the bustle opposite the outlet opening which increases progressively in cross-sectional area in proportion to the quantity of gas transported at any given point until a maximum flow area is reached adjacent the bustle outlet. The gas off-take bustles 13 and 14 have one or more circumferentially spaced tapered hoppers 24 and 25 secured to and opening through the sloping bottom walls thereof. The header assembly 21 comprises a four-way fitting 26 having inlets 27 and 28 and outlets 29 and 30. The fitting inlet 27 is connected to conduit 31 which is connected to the outlet 19 from the gas off-take bustle 13 and which has an open damper 32 therein. The fitting inlet 28 is connected to a conduit 33 which is connected to the outlet 20 from the gas off-take bustle 14 and which has a closed damper 34 therein. The fitting 26 has a tapered hopper 35 secured to and opening through the bottom wall thereof. The fitting outlet 30 is connected to dump stack 36 for emergency dumping of cupola exhaust gases and is provided with a normally closed damper 37. The fitting outlet 29 is connected to a conduit 38 leading to a processing unit, which is not shown, for conditioning or treating the gases, such as by burning out residual CO and removing foreign matter therefrom. The fitting outlet 29 is provided with a normally open damper 39. The header inlet dampers 32 and 34 are provided with suitable actuating devices 40 and 41, respectively. The actuating devices 40 and 41 are shown diagrammatically as electrical operators and are connected by wiring 42 and 43 to a control switch or other control device 44. The actuating devices 40 and 41 and control device 44 are arranged for reverse conjoint operation of the dampers 32 and 34 so that one damper is open while the other is closed. The dampers 37 and 39 are provided with automatic actuators 45 and 46, respectively, which are shown diagrammatically, and may be electrical actuators. The actuators 45 and 46 are arranged for reverse conjoint operation of the dampers 37 and 39 so that one is open while the other is closed. The actuators 45 and 46 are shown diagrammatically as being connected by wiring 47 and 48 to an automatic control member 49. The automatic control member 49 could be a thermostatic switch responsive to the occurrence of a predetermined condition such as excessive temperature at the processing unit and would be operable upon occurrence of such a condition to close the damper 39 and open the damper 37 for emergency dumping of exhaust gases to atmosphere.

Operation

In operation, this cupola apparatus functions generally as follows: The air for combustion of coal or coke in the cupola is supplied through the inlet 5 to the valve 6 and passes through the open outlet 9 and conduit 11 through the cupola air inlet bustle 3. The products of combustion in the cupola are withdrawn through the radial outlets 15 and radially extending conduits 17 into the off-take bustle 13. The tapered construction of the off-take bustle 13 provides an equalization of flow of gases through the various radial outlets from the cupola to compensate for variation in pressure drop at various points around the bustle. The tapered hoppers 24, which underlie the sloping bottom wall 22 of the gas off-take bustle, are provided to collect the heavier foreign particles which settle from the gases which are withdrawn through the off-take bustle. The gas passes out through the outlet 19 from the off-take bustle 13 and pass the open damper 32 in the header assembly 21. The header assembly 21 is provided with a hopper 35 to collect some of the lighter foreign particles in the cupola exhaust gases which did not settle in the bustle hoppers 24. The closed damper 37 and open damper 39 cooperate to direct the flow of exhaust gases through the outlet conduit 38 to the processing unit, which is not shown.

In the event that an abnormal temperature condition occurs at the remote processing unit or in the event that other unsafe occurrences happen to which the control device 49 is set to respond, the control device 49 will cause the actuators 46 and 45 to close the damper 39 and open the damper 37 to provide an emergency dumping of exhaust gases to atmosphere.

When the system is changed to operate cupola 2 instead of cupola 1, the air inlet damper 7 is closed and the inlet damper 8 is opened to direct flow of air to the inlet bustle 4. At the same time, the dampers 32 and 34 controlling flow from the gas off-take bustles 13 and 14 are actuated by the actuators 40 and 41 to closed and open positions, respectively, to effect the discharge of gases from the off-take bustle 14.

Although there has been described only one embodiment of this invention, it will be obvious to those skilled in the art that other embodiments are possible without departing from the scope and intent of this invention which should be limited only by the appended claims.

Having thus described the invention, what is claimed and is desired to be secured by Letters Patent of the United States is:

1. The combination with an iron melting cupola, of an annular gas off-take bustle radially spaced from and surrounding said cupola, a plurality of conduits radially interconnecting said cupola and said bustle, said bustle having an outlet, and said bustle tapering in transverse cross-sectional area from a maximum at said outlet to a minimum at a point diametrically opposite to said outlet.

2. The combination with an iron melting cupola, of an annular gas off-take bustle radially spaced from and surrounding said cupola, a plurality of conduits radially interconnecting said cupola and said bustle, said bustle having an outlet, and said bustle tapering in transverse cross-sectional area from a maximum at said outlet to a minimum at a point diametrically opposite to said outlet, said bustle having a bottom wall sloping from said diametrically opposite point to said outlet.

3. The combination with an iron melting cupola, of an annular gas off-take bustle radially spaced from and surrounding said cupola, a plurality of conduits radially interconnecting said cupola and said bustle, said bustle having an outlet, and said bustle tapering in transverse cross-sectional area from a maximum at said outlet to a minimum at a point diametrically opposite to said outlet, said bustle having a bottom wall sloping downward from said diametrically opposite point to said outlet, and a hopper opening from said bottom wall for collection of foreign matter settling from gas passing through said bustle.

4. The combination with an iron melting cupola, of an annular gas off-take bustle radially spaced from and surrounding said cupola, a plurality of conduits radially interconnecting said cupola and said bustle, said bustle having an outlet, and said bustle tapering in transverse cross-sectional area from a maximum at said outlet to a minimum at a point diametrically opposite to said outlet, said bustle having a bottom wall sloping from said diametrically opposite point to said outlet, and a plurality of tapered hoppers circumferentially spaced around said bustle and opening from said sloping bottom wall for collecting foreign matter settling from gas passing through said bustle.

5. The combination with an iron melting cupola, of an annular gas off-take bustle radially spaced from and surrounding said cupola, a plurality of conduits radially interconnecting said cupola and said bustle, said bustle having an outlet, and said bustle tapering in transverse cross-sectional area from a maximum at said outlet to a minimum at a point diametrically opposite to said outlet, said bustle having a bottom wall sloping downward from said diametrically opposite point to said outlet, and a hopper opening from said bottom wall for collection of foreign matter settling from gas passing through said bustle, said bustle outlet having a pair of discharge passages, dampers in said passages for reverse conjoint operation, and means for operating said dampers whereby one is closed when the other is open and vice versa.

References Cited in the file of this patent

UNITED STATES PATENTS

| | | |
|---|---|---|
| 123,035 | McKernan | Jan. 23, 1872 |
| 1,627,536 | Vial | May 3, 1927 |